United States Patent [19]

Inai

[11] Patent Number: 5,725,304
[45] Date of Patent: Mar. 10, 1998

[54] BATTERY CONCRETE VIBRATOR

[75] Inventor: Masahiko Inai, Anjo, Japan

[73] Assignee: Makita Corporation, Anjo, Japan

[21] Appl. No.: 753,670

[22] Filed: Nov. 27, 1996

[30] Foreign Application Priority Data

Dec. 13, 1995 [JP] Japan ................................. 7-324852
Dec. 13, 1995 [JP] Japan ................................. 7-324853

[51] Int. Cl.⁶ ................................................. B01F 11/00
[52] U.S. Cl. ................................. 366/120; 366/108
[58] Field of Search ............................ 366/108, 117,
366/118, 128, 120, 123; 601/46, 67, 70, 72

[56] References Cited

U.S. PATENT DOCUMENTS

| | | | |
|---|---|---|---|
| 2,278,839 | 4/1942 | Douglass | 366/128 |
| 2,598,895 | 6/1952 | Dreyer . | |
| 3,115,139 | 12/1963 | Schneider | 601/70 |
| 3,188,054 | 6/1965 | Mason, Jr. | 366/128 |
| 3,370,583 | 2/1968 | Teranishi | 601/70 |
| 3,585,990 | 6/1971 | Blachly | 601/72 |
| 3,782,693 | 1/1974 | Strohbeck . | |
| 4,135,826 | 1/1979 | Holm | 366/128 |
| 4,669,452 | 6/1987 | Oswawa | 601/46 |

FOREIGN PATENT DOCUMENTS

| | | | |
|---|---|---|---|
| 0 548 651 A1 | 6/1993 | European Pat. Off. . | |
| 1086820 | 2/1955 | France | 601/72 |
| 21 14 899 | 10/1972 | Germany . | |
| 42 38 564 A1 | 5/1994 | Germany . | |
| 43 17 002 A1 | 11/1994 | Germany . | |
| 195 27 517 A1 | 10/1996 | Germany . | |
| 25646 | 2/1990 | Japan . | |
| 321906 | 5/1991 | Japan . | |
| 548214 | 6/1993 | Japan . | |
| 733577 | 7/1995 | Japan . | |

*Primary Examiner*—Tony G. Soohoo
*Attorney, Agent, or Firm*—Davis and Bujold

[57] ABSTRACT

A concrete vibrator 10 having a direct current motor 3 and a battery pack 19 mounted in a handle housing 17. The battery pack 19 is attached to a hook 75 provided in an opening of the handle housing 17, and a battery cover 80 is attached to completely cover the battery pack 19. Air inlet ports 41, 42 and air exhaust ports 43, 44, 45 are formed in a lower side of a concrete vibrator body between the lower end of handle housing 17 and the lower forward end of a motor housing 11.

7 Claims, 9 Drawing Sheets

BATTERY CONCRETE VIBRATOR

FIELD OF THE INVENTION

This invention relates to concrete vibrators in general, and more particularly to concrete vibrators operated with a battery.

BACKGROUND OF THE INVENTION

A concrete vibrator is used for compacting ready-mixed concrete in a form at a construction site. The concrete vibrator is usually powered by an AC power source, which limits where the concrete vibrator can be used, and a cord extended from the power source may be an obstruction at the site.

Recently, the capacity of a charging battery was enhanced. Therefore, a large number of battery tools can be used at the construction site.

Such battery is usually packaged, and can be removed from the tool when charged. For example, as disclosed in Japanese utility model laid-open No. 5-48214 and Japanese utility model publication No. 3-21906, the battery pack is fixedly hooked on the lower end of an opening in a handle housing during the operation.

However, the concrete vibrator is operated in a dusty environment, like a construction site, where dust easily reaches the hook from a gap between the handle housing and the battery pack. This dust prevents the hook from being compressed or removed from the battery pack. When the concrete vibrator is operated outdoors, rain enters the gap between the battery pack and the handle housing, which adversely affects the electric components housed in the concrete vibrator.

In operation of the prior-art concrete vibrator, as shown in FIG. 9, a vibration rod 101 is inserted into ready-mixed concrete 102. While repeatedly moving a concrete vibrator body vertically, a motor is rotated, causing the vibration rod 101 to vibrate. In this manner the ready mixed concrete 102 is compacted. Some portions of the ready mixed concrete 102 are dispersed via air exhaust ports 103 into the lower or forward part of the body, thereby clogging or closing the air exhaust ports 103.

Since the concrete vibrator is directed downwards during operation, if air exhaust and intake ports are located in the rear end of a housing and directed upwards, rain and foreign particles can easily enter the ports.

The prior-art concrete vibrators thus tend to be easily overheated.

SUMMARY OF THE INVENTION

An object of the present invention is to provide a concrete vibrator having improved versatility and durability, such that the concrete vibrator can be used at any place and air-cooling intake and exhaust ports formed in the concrete vibrator body are prevented from receiving rain and foreign particles.

Another object of the invention is to provide a concrete vibrator that can bear the use in an outdoor, dusty or other severe environment, facilitates attachment and detachment of a battery pack from the concrete vibrator and protects the gap between the handle housing and the battery pack and the inside of the concrete vibrator from rain and foreign particles outside.

To attain this and other objects, the present invention provides a concrete vibrator having a vibration rod projected from the forward end of a motor housing and a motor housed in the motor housing for driving the vibration rod. The motor is a direct current motor, and a battery is accommodated in a handle housing for driving the motor.

The concrete vibrator is powered with a battery, obviating the necessity of an alternate current power source. Since the concrete vibrator is cordless, it can be used anywhere. When the battery is accommodated in a lower part of the handle housing, the center of gravity of the concrete vibrator body shifts toward the lower part. Therefore, when the concrete vibrator body is placed on the ground, the handle housing faces downwardly or horizontally. As a result, the air inlet and exhaust ports, formed in a lower side of the concrete vibrator body, between a lower end of the handle housing and a lower forward end of the motor housing, open downwardly or horizontally and are protected from rain or other.

The space beside the motor in the motor housing is divided into forward and rear chambers. The forward chamber of the motor housing communicates with the air inlet ports, while the rear chamber communicates with the air exhaust ports. Air is introduced from the air inlet ports through the forward chamber toward a forward opening in the motor, and is passed from the forward opening in a motor case toward a rear opening of the motor. Subsequently, air is exhausted from the rear opening though the rear chamber of the motor housing and the air exhaust ports to the outside. A passage of cooling air is thus formed.

In the aforementioned structure, the air inlet and exhaust ports are formed in the lower part of the concrete vibrator body, and are not easily clogged with dispersed ready-mixed concrete, unlike the conventional concrete vibrator.

Especially, when the air inlet and exhaust ports are formed in the vicinity of the attachment root of the handle housing, even if the forward end of the handle housing is accidentally inserted into ready-mixed concrete, the ports are not closed by concrete.

Further, a baffle place is provided inside the air inlet and exhaust ports, and these ports open into the root of the baffle plate. When the vibration rod is directed downwardly, during operation, waterdrops or foreign particles, that accidentally enter the ports, are checked or barred by the baffle plate. The waterdrops or foreign particles stopped by the baffle plate fall from inlet and exhaust ports in the root of the baffle plate, without entering the inside of the motor housing through the inlet and exhaust ports. Preferably, when the labyrinth structure is formed by the baffle plate inside the air inlet ports, foreign particles accidentally taken in via the air inlet ports are inhibited by the baffle plate from entering the motor housing.

In the concrete vibrator, the rear chamber is composed of a looped passage surrounding the rear part of the motor and an exhaust passage connected from a part of the looped passage to the air exhaust ports. By obstructing a part of the looped passage, air is circulated only in one direction in the looped passage. In this structure, air smoothly flows to the air exhaust ports. Therefore, air exhausted even from a plurality of rear openings cannot interfere with one another.

In the concrete vibrator, the battery pack is inserted into an opening in the handle housing, and a battery cover is attached over the opening covering the battery pack. The edge of the battery cover abuts the edge surrounding the opening in the handle housing when the battery cover is closed. The edges are provided with a sealing member.

Since the opening in the handle housing is closed by the battery cover, foreign particles are inhibited from entering the handle housing. Therefore, clogged dust never prevents the battery pack from being removed from the handle housing.

Preferably, the battery cover is rotated relative to the handle housing, and is hooked on a jaw projecting outwardly from the handle housing at the side opposite to a rotary support shaft. Since there is no component to be pushed inwardly when opening the battery cover, even if dust or other foreign matter sticks to the hook, the battery cover can be easily opened.

The sealing member is attached to the edge of the battery cover such that the outer periphery of the battery cover can be partly covered. Even when the concrete vibrator or the electromotive tool accidentally falls on the ground, the sealing member serves as a cushioning member for protecting the electric components accommodated in the electromotive tool from any vibration.

BRIEF DESCRIPTION OF THE DRAWINGS

The invention will now be described, by way of example, with reference to the drawings, in which.

DETAILED DESCRIPTION OF THE PREFERRED EMBODIMENTS

A battery concrete vibrator embodying the present invention is now explained.

Figure 1:
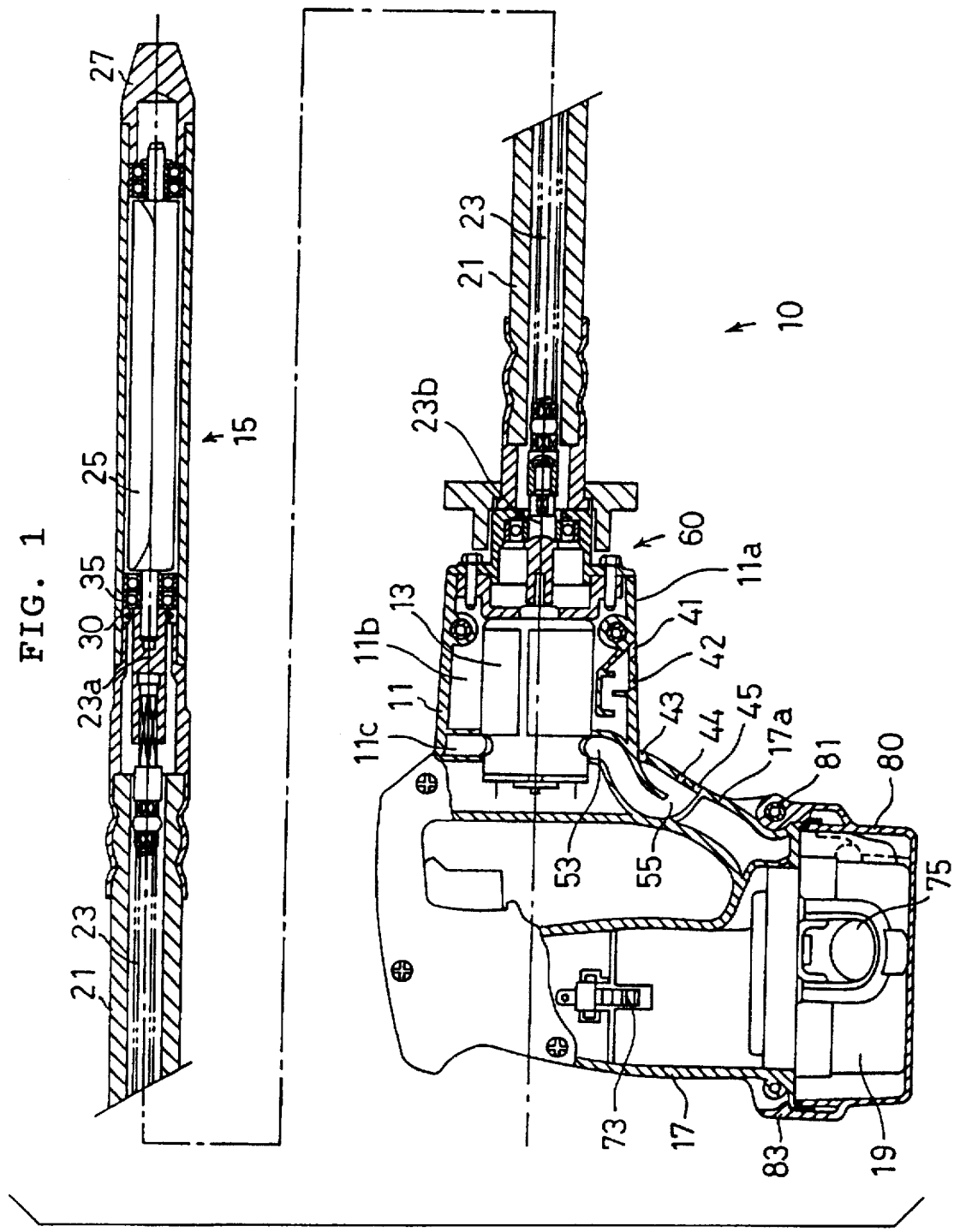
FIG. 1 is a cross-sectional view of a concrete vibrator embodying the present invention.

As shown in FIG. 1, a concrete vibrator 10 for compacting ready-mixed concrete is provided with a direct current motor 13 arranged in a motor housing 11 for vibrating a vibration rod 15. Power is supplied to the direct current motor 13 from a charged battery pack 19 accommodated in the lower part of a handle housing 17. The motor housing 11 and the handle housing 17 are both composed of two longitudinally divided members (shown hatched in FIG. 1).

Figure 2:
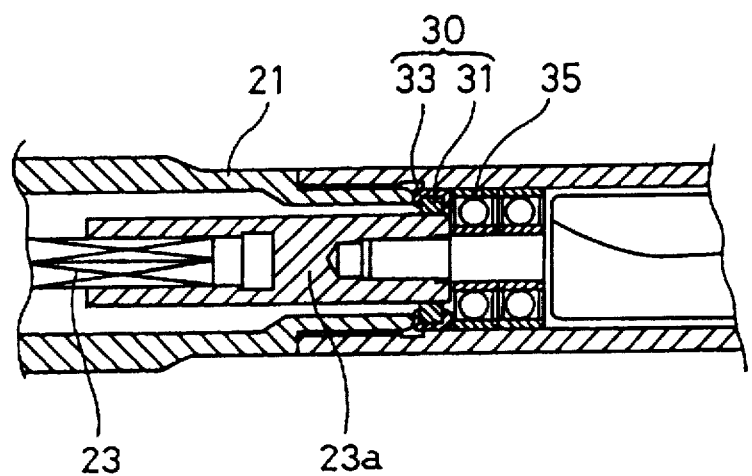
FIG. 2 is an enlarged cross-sectional view with parts broken away, of a vibration rod attached to the concrete vibrator.

The vibration rod 15 is composed of a flexible hose 21 with a flexible shaft 23 passed therein. The tip of the flexible shaft 23 is connected via a joint 23a to an unbalancer 25 having a deviated gravity center. The tip of the vibration rod 15 is covered with a cap 27. The tip of the joint 23a fixedly screwed on the unbalancer 25 is sealed with an annular sealing member 30. As shown in FIG. 2, the sealing member 30 is formed of a felt ring 31 having a square cross section covered with a rubber ring 33 having a U-shaped cross section. The rubber ring 33 surrounds and strengthens the periphery of the felt ring 31. Metal or other particles resulting from the contact between the inner peripheral face of the flexible hose 21 and the outer peripheral face of the flexible shaft 23 are prevented by the sealing member 30 from entering a ball bearing 35 supporting the rear end of the unbalancer 25. The battery-powered concrete vibrator 10 is unsuitable for carrying a large load, and the ball bearing 35, protected by the sealing member 30 from foreign particles, has an improved durability.

Figure 3:
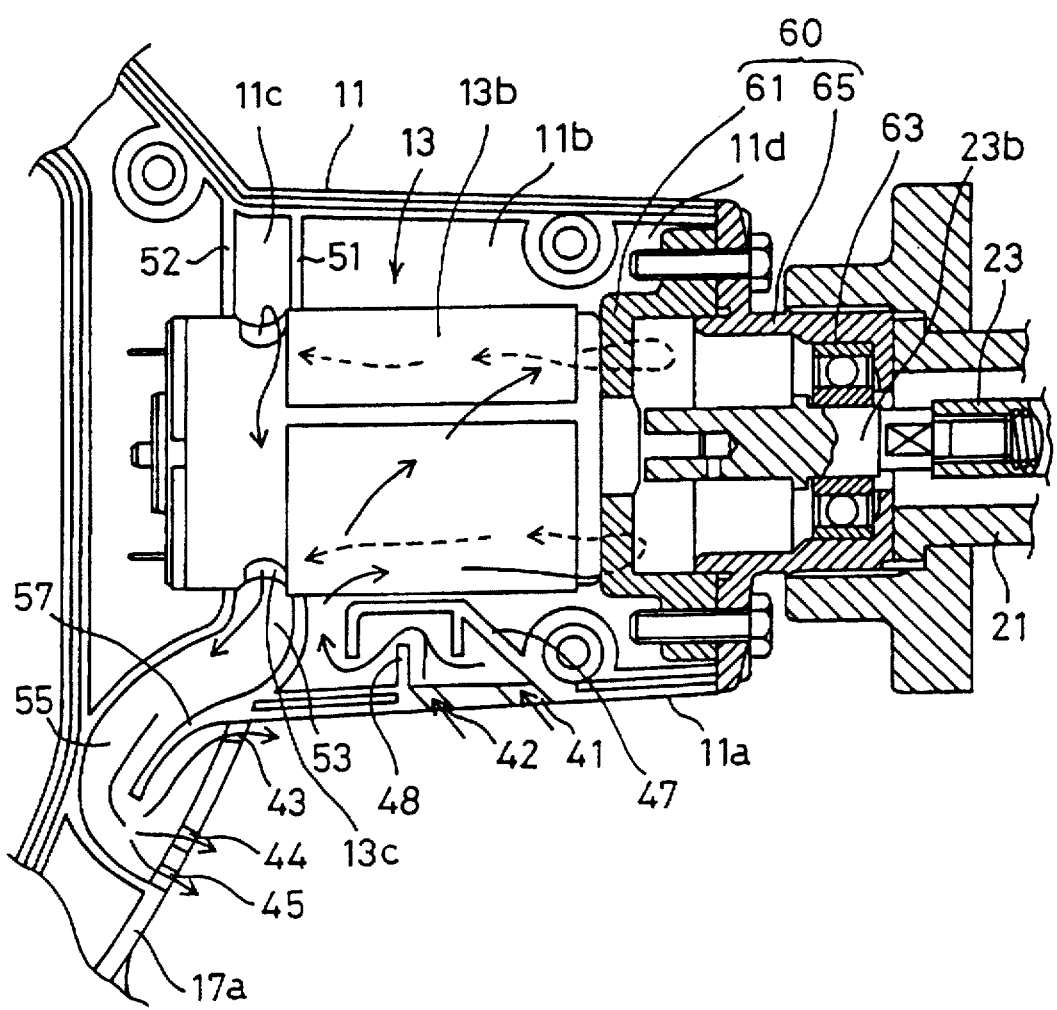
FIGS. 3, 4 and 5 are enlarged cross-sectional views with parts broken away, of a motor housing mounted on the concrete vibrator.

As shown in FIG. 3, cooling air intake ports 41 and 42 are formed in a lower face 11a of motor housing 11, while cooling air exhaust ports 43, 44, 45 are formed in a front face of a lower support 17a of handle housing 17. The air passage defined by the air inlet ports 41 and 42 is provided with baffle plates 47 and 48 forming a labyrinth structure. Foreign particles are prevented by the labyrinth structure from entering the motor housing 11.

In the motor housing 11, the rear end of the direct current motor 13 is supported by annular plates 51 and 52. A looped passage 53 surrounding the rear part of the direct current motor 13 is formed by the annular plates 51 and 52, and is connected downwards via an air exhaust passage 55 to the air exhaust ports 43, 44 and 45. In the air exhaust passage 55 a baffle plate 57 is extended from the root of the lower support 17a of handle housing 17. The baffle plate 57 prevents water and foreign particles that inadvertently enter the air exhaust ports 43, 44 and 45 from entering the motor housing 11. Upon operation of the concrete vibrator, foreign particles are ejected from the air exhaust port 43.

The annular plate 51 disposed in front of the plate 52 partitions the interior of the motor housing 11 into a forward chamber 11b and a rear chamber 11c. The forward chamber 11b is closed by a coupling metal fitting 60 engaged in an forward opening 11d in the motor housing 11.

The coupling metal fitting 60 has a spigot joint between a first coupling metal fitting 61 engaged with the forward end of direct current motor 13 and a second coupling metal fitting 65 provided with a ball bearing 63 supporting the spindle shaft 23b to secure the flexible shaft 23 in the vibration rod 15.

The spigot assembly of the coupling metal fitting 60 has the following advantage. The output shaft of the direct current motor 13 needs to have an axial center aligned with that of the spindle shaft 23b. When the first coupling metal fitting 61 is manufactured with precision, the axial center of the output shaft of the direct current motor 13 can be aligned precisely with that of the first coupling metal fitting 61. Similarly, when the second coupling metal fitting 65 is manufactured with precision, the axial center of the spindle shaft 23b can be precisely aligned with that of the second coupling metal fitting 65. When the first and second coupling metal fittings 61 and 65 are spigot-joined with precision, the output shaft of the direct current motor 13 and the spindle shaft 23b can be connected with the axial centers thereof aligned with each other. This enhanced precision in the alignment of the axial centers is required for battery-powered concrete vibrators because battery powered motors are unsuitable for carrying heavy loads.

The air cooling mechanism of the concrete vibrator 10 of the embodiment is now explained.

Figure 4:
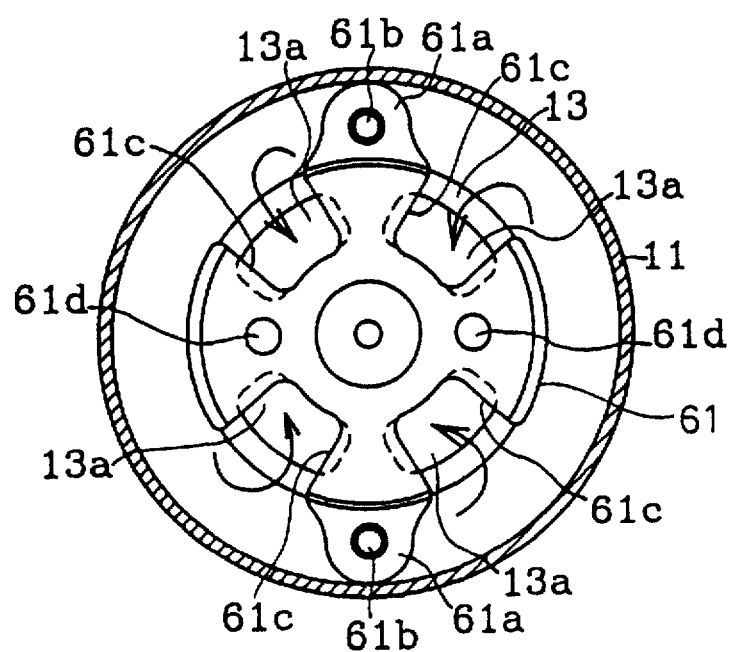

As shown in FIG. 4, the first coupling metal fitting 61 is provided with two jaw-like projections 61a which are vertically opposed to each other. The first coupling metal fitting 61 is fixedly connected with the second coupling metal fitting 65 with a screw passed through a screw hole 61b formed in each projection 61a. The first coupling metal fitting 61 is further provided with four notches 61c to be aligned with a forward opening 13a provided in the direct current motor 13. The first coupling metal fitting 61 is fastened to the direct current motor 13 with two screws passed through horizontally opposite clearance holes 61d.

When the motor 13 rotates, a fan (not shown in FIG. 3) draws cooling air into the forward chamber 11b of the motor housing 11 via air inlet ports 41 and 42. The cooling air is directed into a motor case 13b of the motor 13 via the notches 61c of the first coupling metal fitting 61 and the forward opening 13a of the direct current motor 13.

The cooling air in the motor case 13b is directed toward the rear end of the motor 13, through openings 13c which are vertically opposed to each other in the rear end of the motor 13 and into the looped passage 53.

Figure 5:
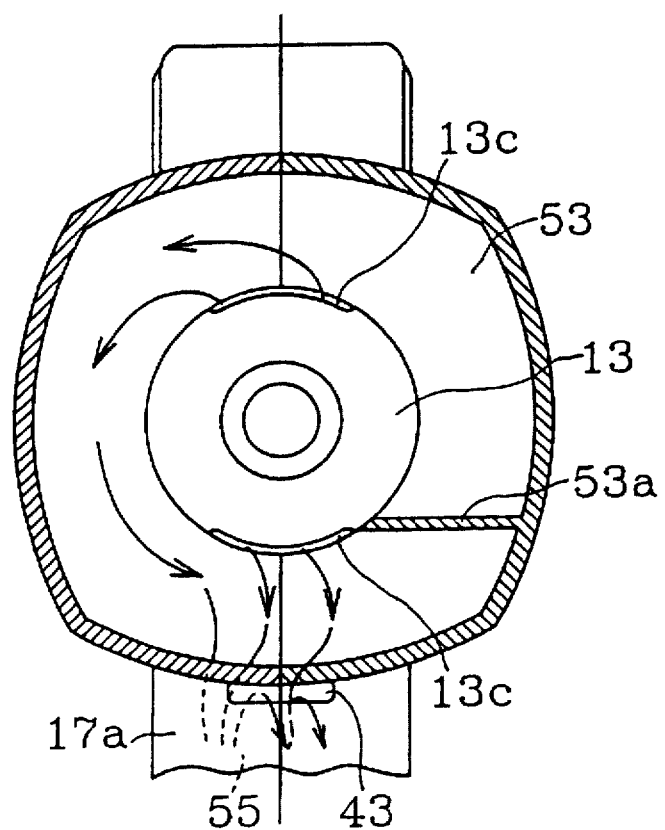

As shown in FIG. 5, a horizontal partition plate 53a is provided to prevent air flow through a portion of the looped passage 53. Therefore, as shown by the arrows in FIG. 5, cooling air flows in one direction in the looped passage 53 before entering an exhaust passage 55. Lastly, cooling air is exhausted from the exhaust passage 55 via the air exhaust ports 43, 44 and 45 to the outside.

The structure for attaching and detaching the battery pack 19 is now explained.

Figure 6:
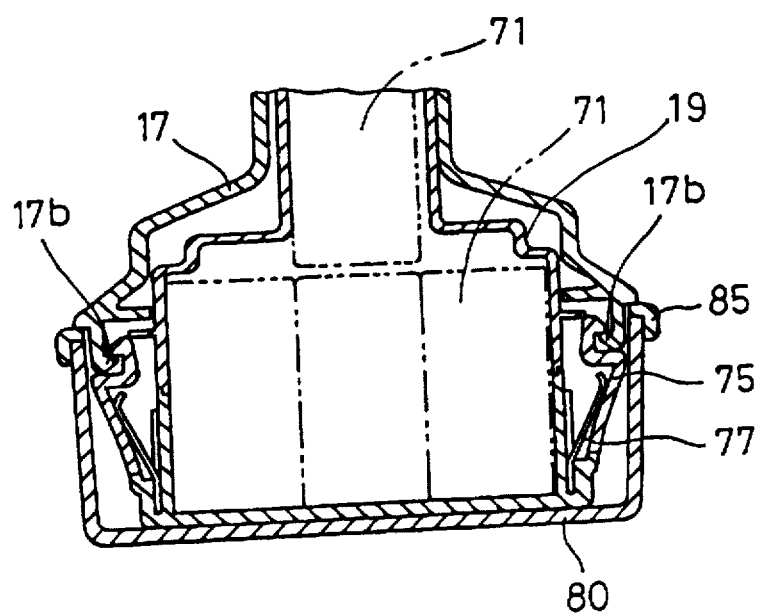
FIGS. 6, 7A and 7B are enlarged cross-sectional views with parts broken away of a handle housing mounted on the concrete vibrator.

In the concrete vibrator 10, as shown in FIG. 1, the charged battery pack 19 is attached to the underside of the handle housing 17. As shown in FIG. 6, a large number of battery cells 71 are accommodated in the battery pack 19 and are electrically connected via a terminal 73 (FIG. 1) at the side of the body of the handle housing 17 to the motor 13. As shown in FIG. 6, the battery pack 19 is attached to the handle housing 17 by engaging a hook 75 with a projection 17b extended from the inner surface of the lower end of the handle housing 17. Since a leaf spring 77 is disposed inside the hook 75, when the hook 75 is pushed inwardly, it disengages from the projection 17b. Subsequently, when the hook 75 is released, the leaf spring urges the hook 75 outwardly to catch the projection 17b.

Figure 7A:
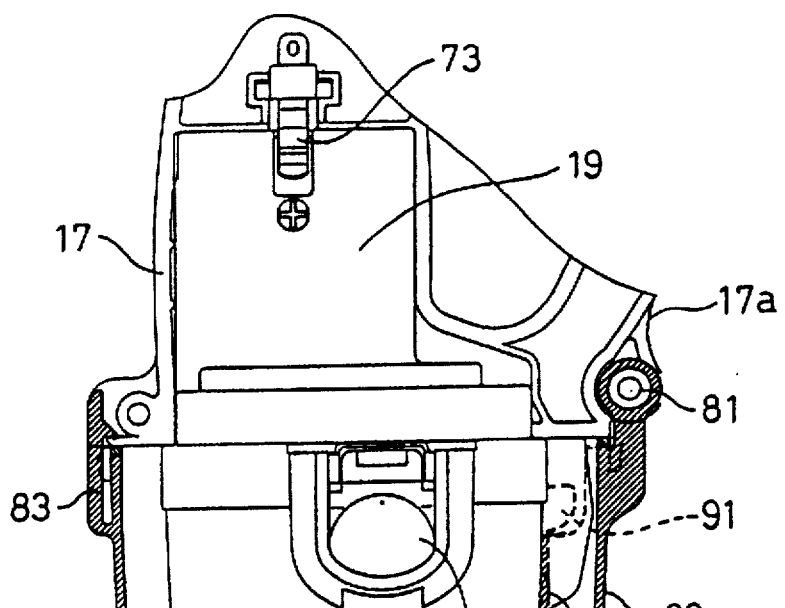
Figure 7B:
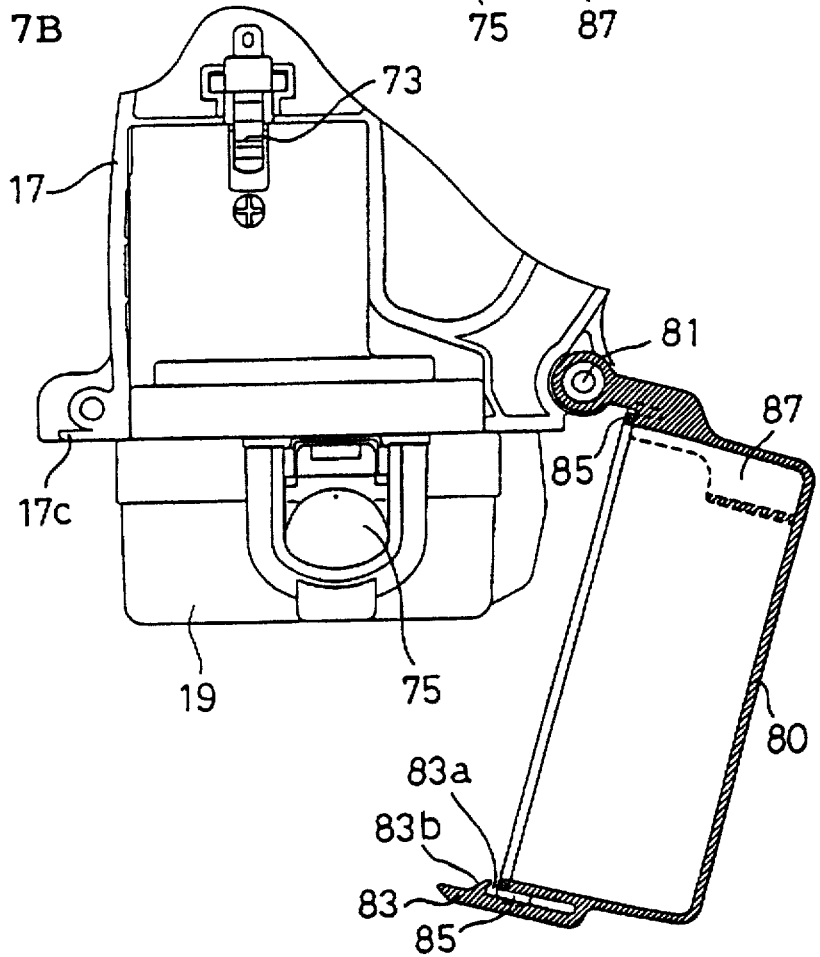

A battery cover 80 covers the outer periphery of the battery pack 19. As shown in FIGS. 7A and 7B, the battery cover 80 is rotatably supported about a shaft 81 under the lower support 17a of the motor housing 17. The battery cover 80 has an engaging member 83 opposite the shaft 81. When the battery cover 80 is closed, the engaging member 83 is engaged with a jaw 17c at the lower end of the handle housing 17. The engaging member 83 has an inclination 83b at the upper part of a hook 83a. Since the engaging member 83 has elasticity, when the battery cover 80 is closed, the inclination 83b contacts the jaw 17c, pushing the engaging member 83 outwardly. As the battery cover 80 is rotated to a closed position, the hook 83a resiliently bends away from the jaw 17c, then returns to its original vertical position and engages with the jaw 17c. The battery cover 80 is opened by pushing the engaging member 83 outwards, thereby disengaging the engaging member 83 from the jaw 17c so that the battery cover 80 can be rotated to an open position.

As shown in FIG. 6, a rubber sealing member 85, attached to the upper edge of the battery cover 80, has an L-shaped cross section for covering the upper edge and its adjacent outer peripheral part of the battery cover 80. Therefore, sealing contact is assured between the battery cover 80 and the handle housing 17.

As shown in FIGS. 7A and 7B, a rib 87 can be provided at the side of the shaft 81 in the battery cover 80, for receiving a battery pack other than the battery pack 19 having the hook engagement. Such battery pack has, for example, a projection 91 shown by a dotted line in FIG. 7A. The projection 91 of the battery pack is engaged with a set plate mounted on the body of the concrete vibrator 10, and is supported by the rib 87 of the battery cover 80. In this manner, such battery pack can be used for the concrete vibrator 10.

The embodiment having the aforementioned structure provides the following advantages.

Even when the concrete vibrator 10 is operated on a rainy day, since the air inlet ports 41, 42 and the air exhaust ports 43, 44, 45 are not directed upwardly, rain is prevented from entering the motor housing 11. The air inlet ports 41, 42 and the air exhaust ports 43, 44, 45 are formed in the vicinity of the root of the handle housing 17, apart from the forward end of the motor housing 11. Therefore, even if the forward end of the handle housing 17 is dropped by mistake on the ready-mixed concrete, the air cooling properties of these ports are not impaired. In addition, the labyrinth structure formed inside the motor and handle housings protects the inside of the concrete vibrator 10 from foreign particles. Water drops and concrete particles dispersed from the surface of the ready-mixed concrete are prevented from entering the motor housing 11 and the handle housing 17. The air cooling properties are thus prevented from being impaired.

During operation, the air inlet port 41 is at the lowermost position of the labyrinth structure in the motor housing 11, while the air exhaust port 43 is at the lowermost position of the labyrinth structure inn the handle housing 17. Therefore, foreign matters which inadvertently enters the housings 11 and 17 can be easily discharged to the outside. Specifically, foreign matter which enters the air exhaust port 43, 44 or 45 is directed along the baffle plate 57 and discharged from the air exhaust port 43.

Figure 8A:
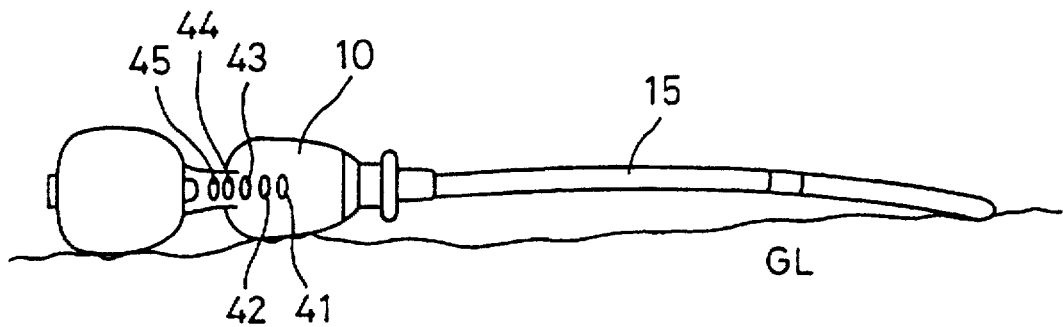
FIGS. 8A, 8B and 8C are diagrammatic views of the concrete vibrator during operation.
Figure 8B:
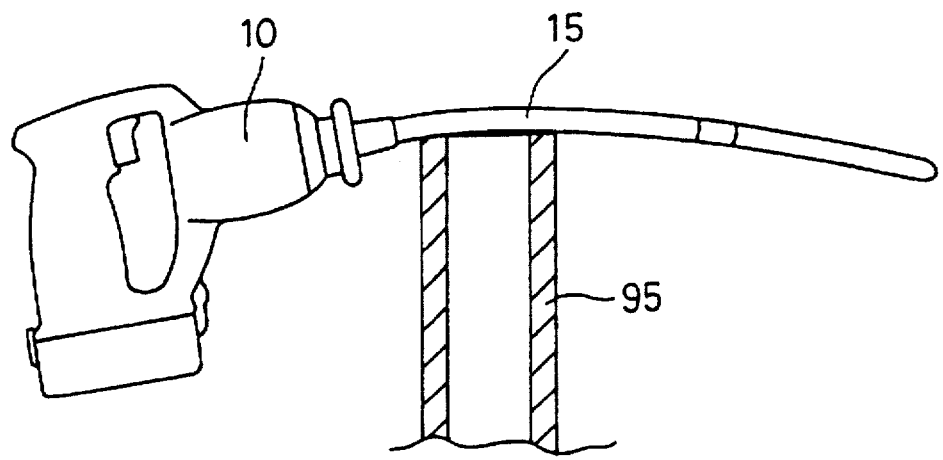
Figure 8C:
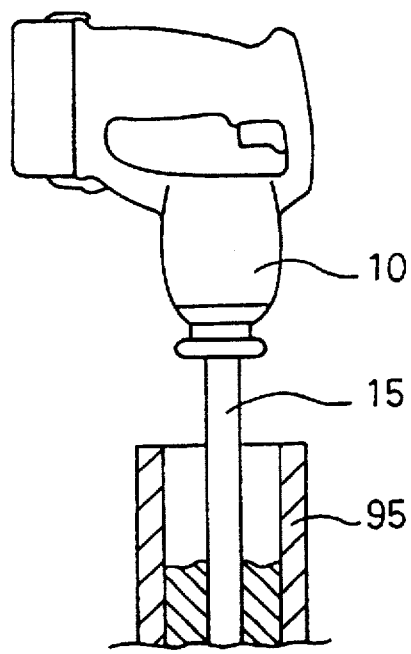
Figure 9:
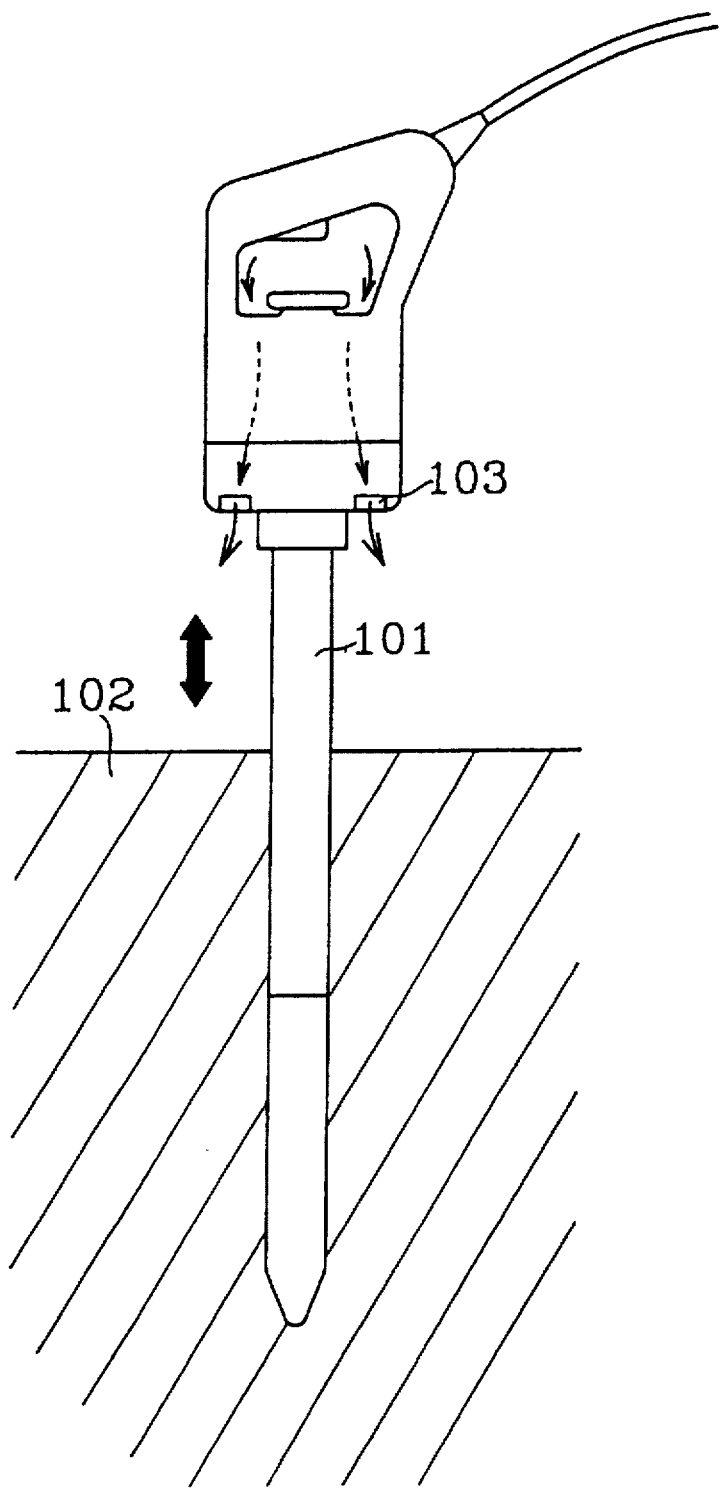
FIG. 9 is a diagrammatic view of a prior-art concrete vibrator during operation.

The battery pack 19 is heavier than the concrete vibrator body accommodating the motor. Therefore, as shown in FIG. 8A, when the concrete vibrator 10 is placed on the ground GL, the body of the concrete vibrator 10 is positioned horizontally so that the air inlet ports 41, 42 and the air exhaust ports 43, 44 and 45 are parallel with the ground GL. Even when the concrete vibrator 10 is rested on the ground GL on a rainy day, rain does not easily enter the motor housing 11. As shown in FIG. 8A, when the concrete vibrator 10 is placed on a form 95, the air inlet ports 41, 42 and the air exhaust ports 43, 44, 45 are directed downwardly because of the weight of the battery pack 19, thereby protecting the housings 11, 17 from rain. As shown in FIG. 8C, when the concrete vibrator 10 is operated, the motor housing 11 and the handle housing 17 are still protected from rain. In this manner, rain is prevented from entering the concrete vibrator 10 whether it is operated or rested. Covering over the ports 41, 32, 43, 44 and 45 is not required, thereby decreasing the number of parts composing the concrete vibrator 10.

Further, an operator can operate the concrete vibrator 10 without feeling hot air on their hand, because the air exhaust ports 43, 44 and 45 face forwards in the handle housing 17. The concrete vibrator 10 with the battery pack 19 mounted thereon can be used anywhere because it is cordless.

Additionally, the vibration rod 15 is sealed and precisely centered, which solves a problem unique to battery powered tools, i.e. failure in operation is caused due to insufficient capacity.

In the embodiment, the battery pack 19 is entirely covered with the battery cover 80, and the hook 75 is kept away from concrete droplets. Therefore, the battery pack 19 is easily attached to and removed from the handle housing 17 with the hook 75, even if ready-mixed concrete adheres to the gap between the battery pack 19 and the handle housing 17. Also, even if ready-mixed concrete adheres to the gap between the engaging member 83 and the handle housing 17, the battery cover 80 can be easily opened by pulling the engaging member 83 outwardly. As shown in FIG. 6, the sealing member 85 surrounds the peripheral part of the joint between the handle housing 17 and the battery cover 80, and serves as a cushioning material when the concrete vibrator 10 is rested on the ground GL.

This invention has been described above with reference to the preferred embodiment as shown in the figures. Modifications and alterations may become apparent to one skilled in the art upon reading and understanding the specification. Despite the use of the specific embodiment for illustration purposes, the invention is intended to include all such modifications and alterations within the spirit and scope of the appended claims.

What is claimed is:

1. A concrete vibrator comprising:

a concrete vibrator body including a motor housing with a forward end and a rear end and a handle housing connected to the rear end of said motor housing, and said concrete vibrator body having a lower side;

a vibration rod projecting from the forward end of said motor housing;

a direct current motor being housed in said motor housing for driving said vibration rod about a rotational axis; and a battery being housed in said handle housing for powering said motor;

wherein said handle housing includes a lower part for accommodating said battery; and air inlet ports and air exhaust ports are provided in the lower side of said concrete vibrator body and located between the lower end of said handle housing and the forward end of said motor housing.

2. A concrete vibrator according to claim 1, wherein said motor housing is spaced apart from said direct current motor to define a forward chamber and a rear chamber, the forward chamber communicates with the air inlet ports and a forward opening in said direct current motor, the rear chamber communicates with the air exhaust ports and a rear opening in said direct current motor, and a cooling air passage is formed from the forward opening in said direct current motor, through a motor case, and to the rear opening in said direct current motor such that the forward chamber communicates with the rear chamber, whereby air drawn into said concrete vibrator body, passes through the air inlet ports, into the forward chamber, through the cooling air passage, into the rear chamber and exhausted from said concrete vibrator body through the air exhaust ports.

3. A concrete vibrator according to claim 2, wherein the rear chamber comprises:

a looped passage surrounding a rear part of said direct current motor;

an exhaust passage extending from said looped passage to said air exhaust ports; and a partition obstructing the looped passage such that, during use, air circulates within said looped passage in one direction only.

4. A concrete vibrator according to claim 1, further comprising a baffle plate is provided in said concrete vibrator body so that the air inlet ports and the exhaust ports open into an attachment root of said baffle plate.

5. A concrete vibrator according to claim 1, wherein said handle housing includes an opening adapted to receive said battery, and a battery cover attached to said handle housing to cover said opening.

6. A concrete vibrator according to claim 5, wherein a sealing member is interposed between said handle housing and said battery cover, when said battery cover is closed.

7. A concrete vibrator according to claim 6, wherein said sealing member is attached to an opened edge of said battery cover such that an outer periphery of said battery cover is partly sealed by said sealing member.

* * * * *